United States Patent
Sybert et al.

(10) Patent No.: US 10,899,877 B2
(45) Date of Patent: Jan. 26, 2021

(54) POLY(ESTER-CARBONATE)S, ARTICLES FORMED THEREFROM, AND METHODS OF MANUFACTURE

(71) Applicant: SABIC GLOBAL TECHNOLOGIES B.V., Bergen op Zoom (NL)

(72) Inventors: Paul Dean Sybert, Evansville, IN (US); Tony Farrell, Bergen op Zoom (NL); Rob Boonman, Oosterhout (NL); Robert Dirk Van De Grampel, Tholen (NL); Mark Adrianus Johannes Van Der Mee, Breda (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 179 days.

(21) Appl. No.: 16/095,755

(22) PCT Filed: Apr. 28, 2017

(86) PCT No.: PCT/IB2017/052506
§ 371 (c)(1),
(2) Date: Oct. 23, 2018

(87) PCT Pub. No.: WO2017/187427
PCT Pub. Date: Nov. 2, 2017

(65) Prior Publication Data
US 2019/0169365 A1      Jun. 6, 2019

Related U.S. Application Data

(60) Provisional application No. 62/328,858, filed on Apr. 28, 2016.

(51) Int. Cl.
*C08G 63/64*      (2006.01)
*C08L 69/00*      (2006.01)

(52) U.S. Cl.
CPC ........... *C08G 63/64* (2013.01); *C08L 69/005* (2013.01); *C08L 2201/08* (2013.01); *C08L 2205/025* (2013.01); *C08L 2207/04* (2013.01)

(58) Field of Classification Search
CPC ................. C08G 63/64; C08L 69/005
See application file for complete search history.

(56) References Cited

U.S. PATENT DOCUMENTS

| 3,030,331 A | 4/1962 | Goldberg |
| 4,189,549 A | 2/1980 | Matsunaga et al. |

(Continued)

FOREIGN PATENT DOCUMENTS

| DE | 10330722 A1 | 2/2005 |
| WO | 2013049967 A1 | 10/2011 |

(Continued)

OTHER PUBLICATIONS

English Translation of Chinese Office Action for Application No. 2017800200476; dated Dec. 24, 2019, 8 pages.

(Continued)

*Primary Examiner* — Edward J Cain

(74) *Attorney, Agent, or Firm* — Cantor Colburn LLP

(57) ABSTRACT

A poly(carbonate-ester) copolymer including carbonate units of the formula (I); and ester units of the formula (II) wherein: T is a $C_{2-20}$ alkylene, a $C_{6-20}$ cycloalkylene, or a $C_{6-20}$ arylene; and $R^1$ and J are each independently a bisphenol A divalent group, or a phthalimidine divalent group or a third divalent group of the formula (III), (IV), (V), (VI) or (VII) wherein $X^a$ is a $C_{6-12}$ polycyclic aryl, $C_{3-18}$ mono- or polycycloalkylene, $C_{3-18}$ mono- or polycycloalkylidene, $-(Q^1)x-G-(Q^2)_y$- group wherein $Q^1$ and $Q^2$ are each independently a $C_{1-3}$ alkylene, G is a $C_{3-10}$ cycloalkylene, x is 0 or 1, and y is 1, provided that the at least one bisphenol A divalent group, at least one phthalimidine divalent group, and at least one third divalent group are present in the poly(carbonate-ester) copolymer.

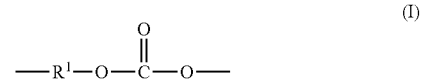

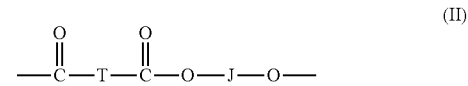

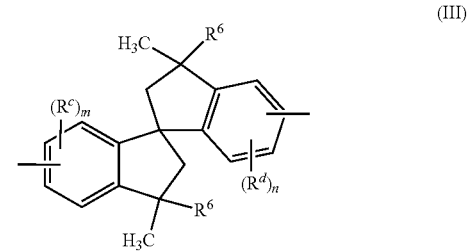

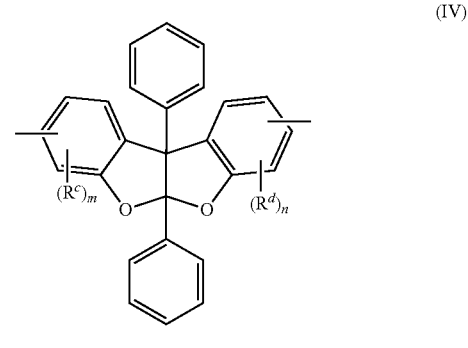

(Continued)

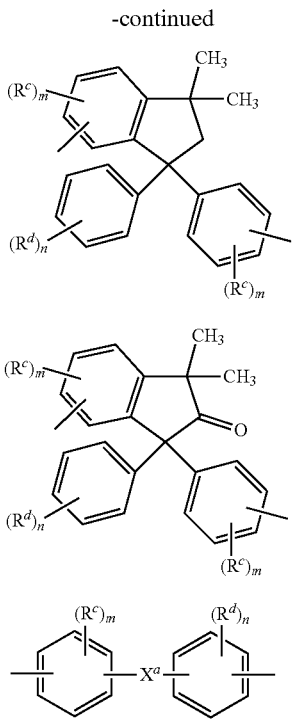

19 Claims, No Drawings

(56) References Cited

U.S. PATENT DOCUMENTS

| | | | |
|---|---|---|---|
| 5,885,497 | A | 3/1999 | Maas et al. |
| 7,189,796 | B2 | 3/2007 | Mitsunaga et al. |
| 7,495,065 | B2 | 2/2009 | Kim et al. |
| 7,495,066 | B2 | 2/2009 | Balakrishnan et al. |
| 8,318,891 | B2 | 11/2012 | Balakrishnan et al. |
| 8,487,065 | B2 | 7/2013 | Mahood et al. |
| 2007/0123687 | A1 | 5/2007 | Balakrishnan et al. |
| 2008/0161507 | A1 | 7/2008 | Chakravarti et al. |
| 2010/0130700 | A1 | 5/2010 | De Brouwer et al. |
| 2010/0267889 | A1 | 10/2010 | Seidel et al. |
| 2010/0286358 | A1 | 11/2010 | Mahood et al. |
| 2011/0071261 | A1 | 3/2011 | Hoeks et al. |
| 2011/0152470 | A1 | 6/2011 | Meyer et al. |
| 2011/0256406 | A1 | 10/2011 | Farrell et al. |
| 2011/0288220 | A1 | 11/2011 | Benten et al. |
| 2011/0306707 | A1 | 12/2011 | Benten et al. |
| 2014/0179855 | A1 | 6/2014 | Farrell et al. |
| 2014/0295363 | A1 | 10/2014 | Sun et al. |
| 2015/0240074 | A1 | 8/2015 | Chen et al. |

FOREIGN PATENT DOCUMENTS

| | | |
|---|---|---|
| WO | 2013175448 A1 | 11/2013 |
| WO | 2014039645 A1 | 3/2014 |
| WO | 2014072923 A1 | 5/2014 |
| WO | 2014097196 A1 | 6/2014 |
| WO | 2015111003 A1 | 7/2015 |
| WO | 2016011332 A1 | 1/2016 |
| WO | 2017187424 A1 | 11/2017 |
| WO | 2017187428 A1 | 11/2017 |
| WO | 2017187430 A1 | 11/2017 |

OTHER PUBLICATIONS

Min; "Synthesis and Characterization of Some Polyestercarbonates"; Polymer Journal, vol. 33, No. 9; 2001, pp. 694-700.
International Search Report for International Application No. PCT/IB2017/052501, International Filing Date Apr. 28, 2017, dated Jul. 14, 2017, 5 pages.
International Search Report for International Application No. PCT/IB2017/052506, International Filing Date Apr. 28, 2017, dated Jul. 6, 2017, 5 pages.
International Search Report for International Application No. PCT/IB2017/052507, International Filing Date Apr. 28, 2017, dated Aug. 3, 2017, 6 pages.
International Search Report for International Application No. PCT/IB2017/052510, International Filing Date Apr. 28, 2017, dated Jul. 6, 2017, 5 pages.
Written Opinion for International Application No. PCT/IB2017/052501, International Filing Date Apr. 28, 2017, dated Jul. 14, 2017, 5 pages.
Written Opinion for International Application No. PCT/IB2017/052506, International Filing Date Apr. 28, 2017, dated Jul. 6, 2017, 6 pages.
Written Opinion for International Application No. PCT/IB2017/052507, International Filing Date Apr. 28, 2017, dated Aug. 3, 2017, 6 pages.
Written Opinion for International Application No. PCT/IB2017/052510, International Filing Date Apr. 28, 2017, dated Jul. 6, 2017, 5 pages.

POLY(ESTER-CARBONATE)S, ARTICLES FORMED THEREFROM, AND METHODS OF MANUFACTURE

CROSS REFERENCE TO RELATED APPLICATIONS

This application is a National Stage application of PCT/IB2017/052506, filed Apr. 28, 2017, which claims the benefit of U.S. Provisional Application No. 62/328,858, filed Apr. 28, 2016, both of which are incorporated by reference in their entirety herein.

BACKGROUND

This disclosure is directed to poly(ester-carbonate)s, thermoplastic compositions containing the poly(ester-carbonate)s, articles formed therefrom, and their methods of manufacture.

Polycarbonates are useful in the manufacture of articles and components for a wide range of applications, from automotive parts to electronic appliances. Because of their broad use, particularly in automotive, lighting and consumer electronics industries, it is desirable to provide polycarbonates having high heat capacities and good surface properties such as the ability to be metalized. In addition, many of these applications require thin wall thicknesses or high flow lengths. Accordingly it is also desirable for these compositions to have good melt flow lengths (low melt viscosities) and good melt stability (lack of melt viscosity shift) at the processing conditions.

SUMMARY

A poly(ester-carbonate) comprises carbonate units of the formula

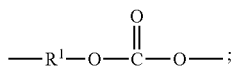

and
ester units of the formula

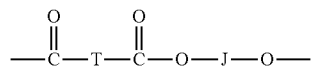

wherein:

T is a $C_{2-20}$ alkylene, a $C_{6-20}$ cycloalkylene, or a $C_{6-20}$ arylene; and $R^1$ and J are each independently a bisphenol A divalent group of the formula

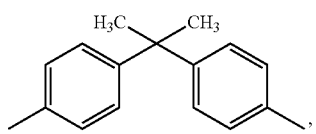

or a phthalimidine divalent group of the formula

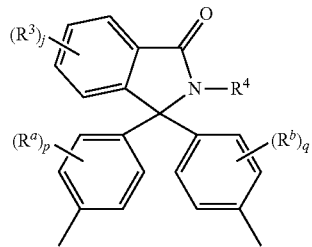

wherein
$R^a$ and $R^b$ are each independently a $C_{1-12}$ alkyl, $C_{2-12}$ alkenyl, $C_{3-8}$ cycloalkyl, or $C_{1-12}$ alkoxy,
each $R^3$ is independently a $C_{1-6}$ alkyl,
$R^4$ is hydrogen, $C_{1-6}$ alkyl or phenyl optionally substituted with 1 to 5 $C_{1-6}$ alkyl groups,
p, q, and j are each independently 0 to 4,
or a third divalent group of the formula

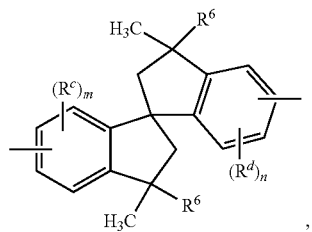

,

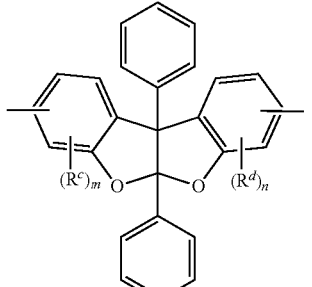

,

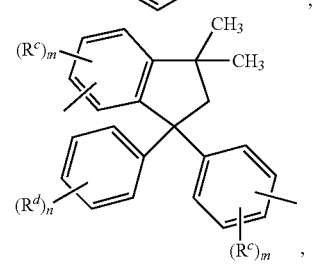

,

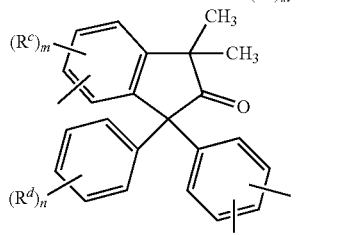

, or

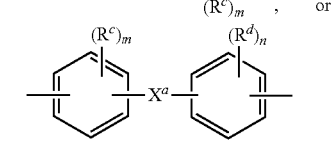

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, and y is 1, and m and n are each independently 0 to 4, provided that the at least one bisphenol A divalent group, at least one phthalimidine divalent group, and at least one third divalent group are present in the poly(carbonate-ester) copolymer.

In another embodiment, disclosed is a thermoplastic composition comprising the poly(ester-carbonate).

In yet another embodiment, an article comprises the above-described poly(ester-carbonate) or thermoplastic composition.

In still another embodiment, a method of manufacture of an article comprises molding, extruding, or shaping the above-described poly(ester-carbonate) or thermoplastic composition into an article.

The above described and other features are exemplified by the following drawings, detailed description, examples, and claims.

DETAILED DESCRIPTION

The inventors hereof have found that poly(ester-carbonate)s disclosed herein can have high heat resistance and good surface properties. The poly(ester-carbonate)s, also known as polyester-polycarbonates, comprise carbonate units of the formula (1)

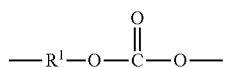

(1)

and
ester units of the formula (2)

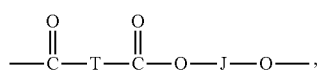

(2)

wherein T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene, preferably $C_{6-20}$ divalent aromatic radical such as a divalent isophthaloyl radical, a divalent terephthaloyl radical, or a combination thereof, and $R^1$ and J are each independently a bisphenol A divalent group or a phthalimidine divalent group, or a third divalent group different from the bisphenol A divalent group and the phthalimidine divalent group, provided that at least one bisphenol A divalent group, at least one phthalimidine divalent group, and at least one third divalent group are present in the poly(carbonate-ester) copolymers.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98.

Aliphatic dicarboxylic acid that can be used to prepare the polyester units include a linear $C_{6-20}$ aliphatic dicarboxylic acid (which includes a reactive derivative thereof), preferably a linear $C_6-C_{12}$ aliphatic dicarboxylic acid (which includes a reactive derivative thereof). Specific dicarboxylic acids include n-hexanedioic acid (adipic acid), n-decanedioic acid (sebacic acid), and alpha, omega-$C_{12}$ dicarboxylic acids such as dodecanedioic acid (DDDA).

The bisphenol A divalent group is of the formula

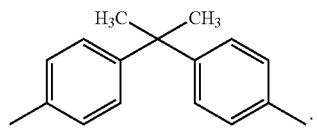

The phthalimidine divalent group is of the formula

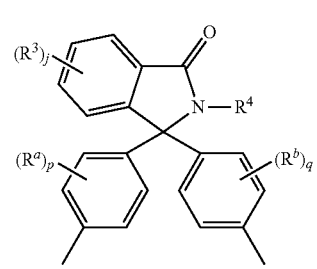

(3)

wherein $R^a$ and $R^b$ are each independently a $C_{1-12}$ alkyl, $C_{2-12}$ alkenyl, $C_{3-8}$ cycloalkyl, or $C_{1-12}$ alkoxy, preferably a $C_{1-3}$ alkyl, each $R^3$ is independently a $C_{1-6}$ alkyl, $R^4$ is hydrogen, $C_{1-6}$ or $C_{2-6}$ alkyl or phenyl optionally substituted with 1 to 5 $C_{1-6}$ alkyl groups, and p, q, and j are each independently 0 to 4, preferably 0 to 1. For example, the phthalimidine carbonate units can be of formula (3a)

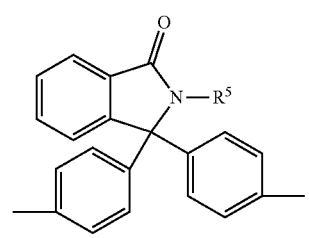

(3a)

wherein $R^5$ is hydrogen, phenyl optionally substituted with up to five $C_{1-6}$ alkyl groups, or $C_{1-4}$ alkyl, preferably $C_{2-4}$ alkyl. In an embodiment, $R^5$ is hydrogen or phenyl. When $R^5$ is phenyl, $R^1$ and J can be derived from 2-phenyl-3,3'-bis (4-hydroxy phenyl)phthalimidine (also known as 3,3-bis(4-hydroxyphenyl)-2-phenylisoindolin-1-one or N-phenyl phenolphthalein or "PPPBP").

The third divalent group is of the formula (4), (5), (6), (16), or (17)

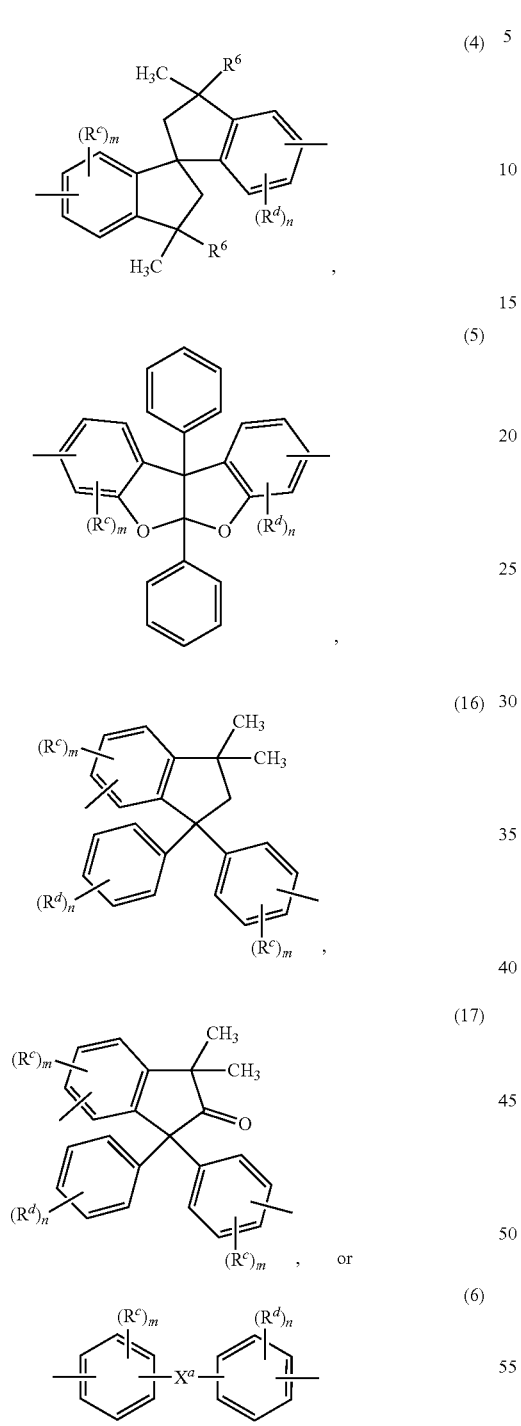

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, and y is 1; and m and n are each independently 0 to 4.

Exemplary third divalent group includes the following:

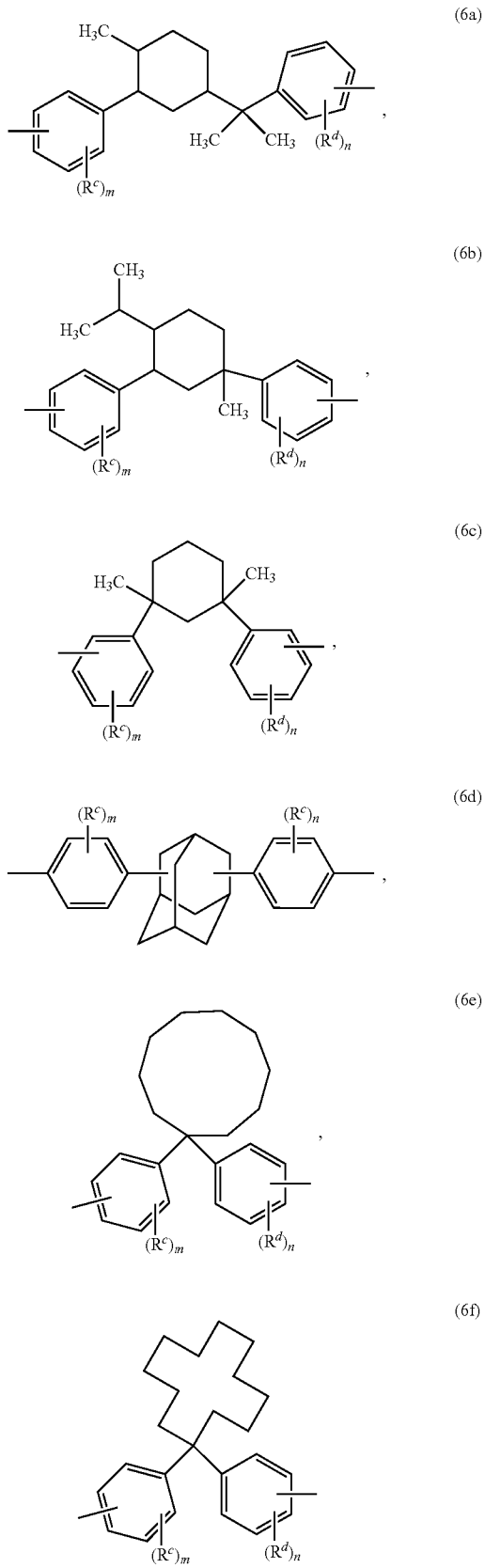

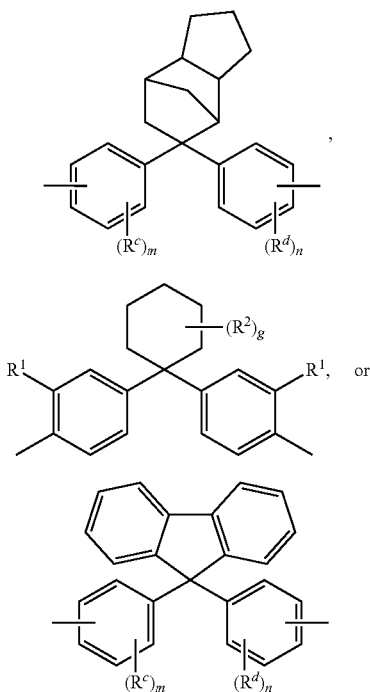

wherein $R^c$ and $R^d$ are the same as defined herein for formulas (4)-(6), (16), and (17), each $R^1$ is independently hydrogen or $C_{1-4}$ alkyl, m and n are each independently 0 to 4, each $R^2$ is independently $C_{1-4}$ alkyl or hydrogen, and g is 0 to 10. In a specific embodiment the third divalent group is derived from 1,1-bis(4-hydroxyphenyl)-3,3,5-trimethyl-cyclohexane, 1,1-bis(4-hydroxy-3-methylphenyl)cyclohexane, or a combination thereof. Preferably, the third divalent group is derived from 1,1-bis(4-hydroxyphenyl)-3,3,5-trimethyl-cyclohexane (BPA TMC).

$R^1$ and J divalent groups can be derived from the corresponding bisphenols. The bisphenol A divalent group is derived from bisphenol A

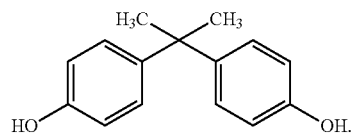

The phthalimidine divalent group is derived from a phthalimidine bisphenol of the formula

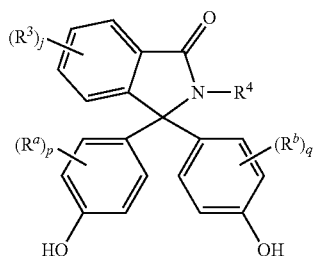

wherein $R^3$, $R^4$, $R^a$, $R^b$, p, q, and j are the same as defined herein for formula (3).

The third divalent group is derived from a bisphenol of the follow formula

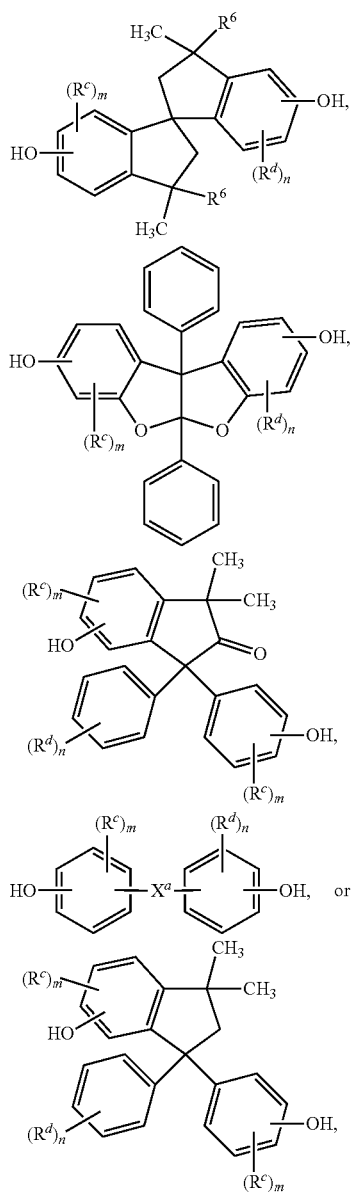

wherein $R^c$, $R^d$, $R^6$, m, and n are the same as defined herein for formulas (4)-(6), (16), and (17).

The molar ratio of ester units to carbonate units in the copolymers can vary broadly, for example 1:99 to 99:1, preferably 10:90 to 90:10, more preferably 25:75 to 75:25, or 2:98 to 15:85 or 2:1 to 1:2, depending on the desired properties of the final composition.

The poly(ester-carbonate)s comprise 45 mol % to 70 mol % of the bisphenol A divalent groups, 2 mol % to 50 mol % of the phthalimidine divalent groups, and 5 mol % to 30 mol % of the third divalent groups, each based on the sum of moles of the bisphenol A divalent groups, phthalimidine divalent groups, and third divalent groups. In specific embodiments, the poly(ester-carbonate)s comprise 50 mol % to 65 mol % of the bisphenol A divalent groups, 4 mol % to 20 mol % of the phthalimidine divalent groups, and 3 mol % to 28 mol % of the third divalent groups, each based on the sum of the moles of the bisphenol A divalent groups, phthalimidine divalent groups, and third divalent groups.

The poly(ester-carbonate)s can have a weight average molecular weight of 10,000 to 50,000 Daltons, preferably 18,000 to 25,000 Daltons, as measured by gel permeation chromatography (GPC), using a crosslinked styrene-divinyl-benzene column and calibrated to bisphenol A homopolycarbonate reference standards. GPC samples are prepared at a concentration of 1 mg per ml, and are eluted at a flow rate of 1.5 ml per minute.

In an embodiment, the poly(ester-carbonate)s have flow properties useful for the manufacture of thin articles. Melt volume flow rate (often abbreviated MVR) measures the rate of extrusion of a thermoplastic through an orifice at a prescribed temperature and load. poly(ester-carbonate)s useful for the formation of thin articles can have an MVR of 2 to 50, preferably 5 to 40 cm$^3$/10 minutes, measured at 337° C. under a load of 6.7 kg in accordance with ASTM D1238-04.

The poly(ester-carbonate)s have a high glass transition temperature (Tg). The Tg of the poly(ester-carbonate)s is 195 to 235° C., preferably 200 to 230° C., determined by differential scanning calorimetry (DSC) as per ASTM D3418 with a 20° C./min heating rate.

The poly(ester-carbonate)s can have high heat resistance. The heat deflection temperature (HDT) of the poly(ester-carbonate)s is 180 to 215° C., preferably 200 to 210° C., measured flat on a 80×10×4 mm bar with a 64 mm span at 0.45 MPa according to ISO 75/Bf.

The poly(ester-carbonate)s can have high Vicat softening temperature. In an embodiment, the poly(ester-carbonate)s have a Vicat B 120 of 195 to 235° C., preferably 200 to 230° C., measured according to ISO 306.

The poly(ester-carbonate)s can have excellent metallization properties. In an embodiment, a metalized sample of the poly(ester-carbonate)s has a defect onset temperature that is within 20 degrees Celsius of the heat deflection temperature of the copolycarbonate where the HDT is measured flat on a 80×10×4 mm bar with a 64 mm span at 0.45 MPa according to ISO 75/Bf. In another embodiment, a metalized sample of the poly(ester-carbonate)s has a defect onset temperature that is within 10 degrees Celsius of the heat deflection temperature of the copolycarbonate where the HDT is measured flat on a 80×10×4 mm bar with a 64 mm span at 0.45 MPa according to ISO 75/Bf. In another embodiment, the metalized sample has a defect onset temperature of 200 to 220° C.

The poly(ester-carbonate)s can have a visual transmission (Tvis) of 70% to 90% measured on HAZE-GUARD plus from BYK-Gardner instruments.

The poly(ester-carbonate)s can further have a Notched Izod Impact of 5 to 10 KJ/m$^2$, determined in accordance with ISO 180 under a load of 5.5 J at 23° C. on a sample plaque of 3 mm thickness.

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

Also disclosed are thermoplastic compositions comprising the poly(ester-carbonate)s. In addition to the poly(ester-carbonate)s, the thermoplastic compositions can further comprise a polycarbonate homopolymer such as a bisphenol A homopolycarbonate, an additional poly(ester-carbonate), or a combination comprising at least one of the foregoing. The poly(ester-carbonate)s can be present in an amount of 40 wt. % to 90 wt. % and the polycarbonate homopolymer, the additional poly(ester-carbonate), or a combination thereof can be present in an amount of 30 wt. % to 60 wt. %, each based on the total weight of the thermoplastic composition.

The additional poly(ester-carbonate)s can further contain, in addition to recurring carbonate chain units derived from a dihydroxy compound, repeating ester units of formula (7)

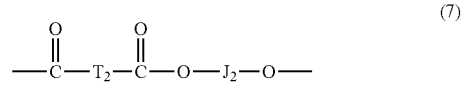

(7)

wherein $J_2$ is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, preferably, 2, 3, or 4 carbon atoms; and $T_2$ is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Copolyesters containing a combination of different T or J groups can be used. The polyester units can be branched or linear.

Specific dihydroxy compounds include resorcinol, bisphenols used to make the carbonate units of formula (1), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Aliphatic dicarboxylic acids that can be used include $C_{6-20}$ aliphatic dicarboxylic acids (which includes the terminal carboxyl groups), preferably linear $C_{8-12}$ aliphatic dicarboxylic acid such as decanedioic acid (sebacic acid); and alpha, omega-$C_{12}$ dicarboxylic acids such as dodecanedioic acid (DDDA). Specific dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1, preferably, 10:90 to 90:10, more preferably, 25:75 to 75:25, or from 2:98 to 15:85. In some embodiments the molar ratio of ester units to carbonate units in the poly(ester-carbonate)s can vary from 1:99 to 30:70, preferably 2:98 to 25:75, more preferably 3:97 to 20:80, or from 5:95 to 15:85.

The thermoplastic compositions can include various additives ordinarily incorporated into polymer compositions of this type, with the proviso that the additive(s) are selected so as to not significantly adversely affect the desired properties of the thermoplastic composition, in particular melt flow, thermal, and surface properties. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 wt. %, based on the total weight of the thermoplastic composition. The thermoplastic compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

The thermoplastic composition can have an MVR of 2 to 50, preferably 5 to 35 cm$^3$/10 minutes, measured at 337° C. under a load of 6.7 kg in accordance with ASTM D1238-04.

The thermoplastic compositions are generally processed at conditions that give suitable melt flow without significant degradation or shift in the melt viscosity. In an embodiment, the thermal plastic compositions can have at a given temperature a melt viscosity of less than 1000 Pa·s at 644.5 sec$^{-1}$ (according to ISO11443) and have a shift in melt viscosity of less than 30% at that temperature over 30 min under a nitrogen atmosphere as measured in a dynamic oscillatory time sweep rheology at a fixed angular frequency of 10 radians/sec.

In another embodiment, the thermal plastic compositions can have at a given temperature a melt viscosity of less than 900 Pa·s at 644.5 sec$^{-1}$ and have a shift in melt viscosity of less than 25% at that temperature over 30 min under a nitrogen atmosphere as measured in a small amplitude oscillatory time sweep rheology at a fixed angular frequency of 10 radians/sec.

The thermoplastic composition can have a heat deflection temperature (HDT) of 180 to 215° C., measured flat on a 80×10×4 mm bar with a 64 mm span at 0.45 MPa according to ISO 75/Bf.

The thermoplastic composition can have excellent metallization properties. In an embodiment, a metalized sample of the thermoplastic composition has a defect onset temperature that is within 10 degrees Celsius of the heat deflection temperature of the copolycarbonate where the HDT is measured flat on a 80×10×4 mm bar with a 64 mm span at 0.45 MPa according to ISO 75/Bf.

Shaped, formed, or molded articles comprising the poly(ester-carbonate)s or the thermoplastic compositions are also provided. The poly(ester-carbonate)s and compositions can be molded into useful shaped articles by a variety of methods, such as injection molding, extrusion, rotational molding, blow molding, and thermoforming. Some example of articles include computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. Additional exemplary articles include a plug, a plug housing, a switch, an electrical conductor, a connector, an electric board, a lamp holder, a lamp cover, a lamp bezel, a reflector, a signal indicator, glazing, a lens, a lens holder, a waveguide element, a collimator, a light emitting diode, a diffuser sheet, a safety pane, a film, a film laminate, a safety goggle, and a visor.

The article comprising the poly(ester-carbonate)s or the thermoplastic compositions can be a metallized article. The metallized article comprises, for example, a substrate comprising the poly(ester-carbonate)s, or thermoplastic compositions, with a metal layer disposed on the at least one side of the substrate.

The substrate can be for example, a film. The substrate can be made by molding the poly(ester-carbonate)s or the thermoplastic compositions. The molding methods are not particularly limited, and various known molding methods can be listed, for example, injection molding, gas assist injection molding, vacuum molding, extrusion, compression molding, calendaring, rotary molding, etc. Of these, molding is usually carried out by injection molding.

The metal layer can be disposed onto the surface of the substrate with the aid of electrocoating deposition, physical vapor deposition, or chemical vapor deposition or a suitable combination of these methods. Sputtering processes can also be used. The metal layer resulting from the metallizing process (e.g., by vapor deposition) can be 0.001 to 50 micrometers (am) thick.

A base coat can be present between the substrate and the metal layer. However, it is advantageous to form the metal layer directly on the substrate surface without forming an undercoat. The surfaces of the substrate are smooth and good gloss can be obtained even by direct metal vapor deposition without treating the substrate with a primer. Moreover, the release properties of the molded substrate during injection molding are good. Accordingly, the surface properties of the molded substrate are superior without replication of mold unevenness.

Chrome, nickel, aluminum, etc. can be listed as examples of vaporizing metals. Aluminum vapor deposition is used in one embodiment as metal vapor deposition. The surface of the molded substrate can be treated with plasma, cleaned, or degreased before vapor deposition in order to increase adhesion.

The metallized article can have a protective layer disposed on the metal layer. "Protective layer" refers for example, to a layer which is made of a binder or a high molecular weight polymer and formed on the outermost (e.g., the UV blocking) layer, so as to exert the effects of preventing marring and improving mechanical properties of the multilayer article. The protective layer can be clear or pigmented and be formulated, for example, with nitrocellulose or synthetic polymers configured to quickly dry by evaporation without chemical reaction with the layer on which they are disposed, providing a solid protective layer. The protective coating material can further be thinned with alcohols. In certain applications, the thickness of the protective layer is minimized. The thickness of the protective layer can be, for example, 0.2 am or less.

The metallized articles can have little mold shrinkage, have good surface gloss even when metal layers are directly vapor deposited, and the vapor deposited surfaces do not become cloudy or have rainbow patterns even on heating of the vapor deposited surface. In particular, the metallized article can have no surface defects visible to the eye.

Illustratively, the metallized article has a metallized surface, wherein the surface can exhibit a gloss of greater than 95 units, or greater than 1700 units, measured at 20 degrees using a trigloss meter. The metallized surface can also retain 85%, 88%, 90%, 95% or more of its gloss after heat aging at 150° C. for 1 hour, measured at 20 degrees using a micro trigloss meter. A base coat (undercoat) can be present between the article and the metallized surface, or a surface of the article can be directly metallized.

Metallized articles have applications in optical reflectors and can be used for automotive headlamps, headlight extensions, and headlamp reflectors, for indoor illumination, for vehicle interior illumination and for the like.

Set forth below are various embodiments of the disclosure.

Embodiment 1

A poly(carbonate-ester) copolymer comprising carbonate units of the formula

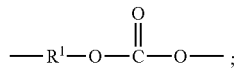

and
ester units of the formula

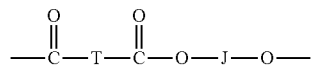

wherein:
T is a $C_{2-20}$ alkylene, a $C_{6-20}$ cycloalkylene, or a $C_{6-20}$ arylene; and
$R^1$ and J are each independently a bisphenol A divalent group of the formula

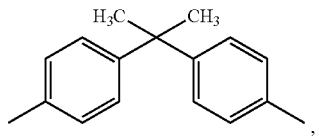

or a phthalimidine divalent group of the formula

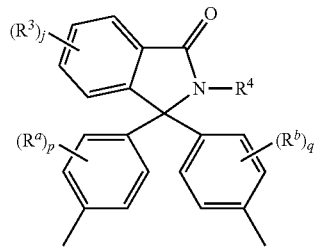

wherein
$R^a$ and $R^b$ are each independently a $C_{1-12}$ alkyl, $C_{2-12}$ alkenyl, $C_{3-8}$ cycloalkyl, or $C_{1-12}$ alkoxy,
each $R^3$ is independently a $C_{1-6}$ alkyl,
$R^4$ is hydrogen, $C_{1-6}$ alkyl or phenyl optionally substituted with 1 to 5 $C_{1-6}$ alkyl groups,
p, q, and j are each independently 0 to 4,
or a third divalent group of the formula

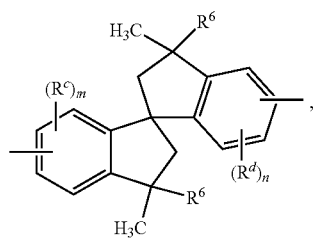

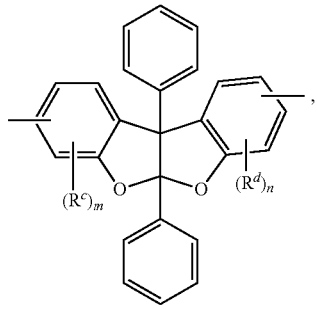

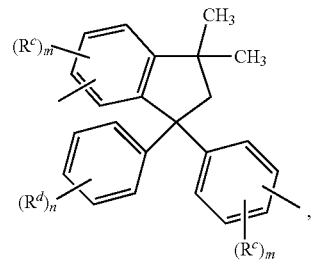

15

-continued

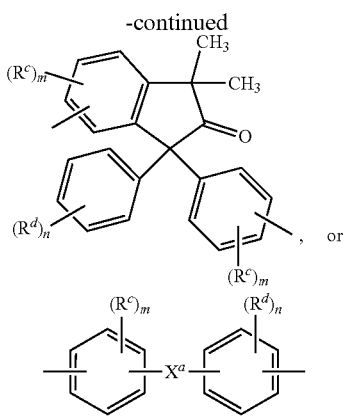

wherein $R^c$ and $R^d$ are each independently a $C_{2-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, and y is 1, and m and n are each independently 0 to 4, provided that the at least one bisphenol A divalent group, at least one phthalimidine divalent group, and at least one third divalent group are present in the poly(carbonate-ester) copolymer.

Embodiment 2

The poly(carbonate-ester) copolymer of Embodiment 1, wherein T is a $C_{6-20}$ divalent aromatic radical.

Embodiment 3

The poly(carbonate-ester) copolymer of Embodiment 1 or Embodiment 2, wherein T is a divalent isophthaloyl radical, a divalent terephthaloyl radical, or a combination thereof.

Embodiment 4

The poly(carbonate-ester) copolymer of any one of Embodiments 1 to 3, wherein the molar ratio of the carbonate units relative to the ester units is 2:1 to 1:2.

Embodiment 5

The poly(carbonate-ester) copolymer of any one of Embodiments 1 to 4, wherein p, q, and j are zero, and $R^4$ is hydrogen, methyl, or phenyl.

Embodiment 6

The poly(carbonate-ester) copolymer of any one of Embodiments 1 to 5, wherein the third divalent group has the structural formula

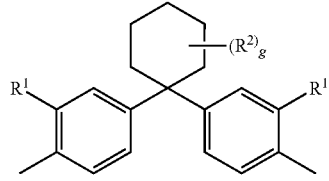

16 wherein each $R^1$ is independently hydrogen or $C_{1-4}$ alkyl, each $R^2$ is independently $C_{1-4}$ alkyl or hydrogen, and g is 0 to 10.

Embodiment 7

The poly(carbonate-ester) copolymer of Embodiment 6, wherein $R^1$ is methyl or hydrogen, $R^2$ is methyl or ethyl, and g is 0 to 3.

Embodiment 8

The poly(carbonate-ester) copolymer of any one or more of Embodiments 1 to 7, wherein the third divalent group is derived from 1,1-bis(4-hydroxyphenyl)-3,3,5-trimethyl-cyclohexane.

Embodiment 9

The poly(carbonate-ester) copolymer of any one or more of Embodiments 1 to 5, wherein the third divalent group has the structural formula

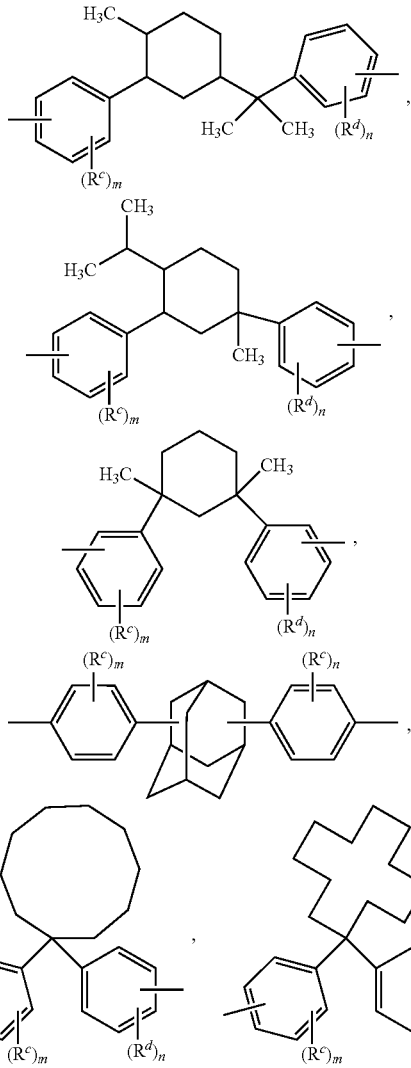

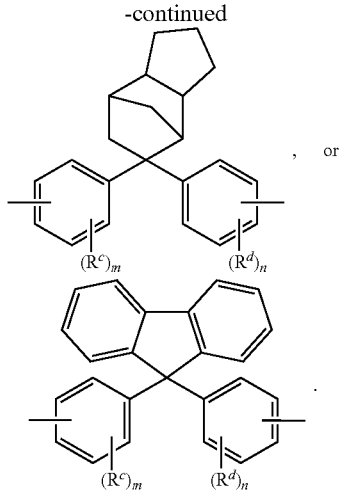, or wherein $R^c$ and $R^d$ are each independently a $C_{1-12}$ alkyl, $C_{2-12}$ alkenyl, $C_{3-8}$ cycloalkyl, or $C_{1-12}$ alkoxy; and m and n are each independently 0 to 4.

Embodiment 10

The poly(carbonate-ester) copolymer of any one or more of Embodiments 1 to 9, wherein the phthalimidine divalent group is present in an amount of 5 mol % to 30 mol % based on the sum of the moles of the bisphenol A divalent group, the phthalimidine divalent group, and the third divalent group.

Embodiment 11

The poly(carbonate-ester) copolymer of any one or more of Embodiments 1 to 10, wherein third divalent group is present in an amount of 2 mol % to 50 mol % based on the sum of the moles of the bisphenol A divalent group, the phthalimidine divalent group, and the third divalent group.

Embodiment 12

The poly(carbonate-ester) copolymer of any one or more of Embodiments 1 to 11, wherein the bisphenol A divalent group is present in an amount of 45 mol % to 70 mol % based on the sum of the moles of the bisphenol A divalent group, the phthalimidine divalent, and the third divalent group.

Embodiment 13

A thermoplastic composition comprising a poly(carbonate-ester) copolymer of any one or more of Embodiments 1 to 12.

Embodiment 14

The thermoplastic composition of Embodiment 13 further comprising a polycarbonate homopolymer, an additional poly(ester-carbonate), or a combination comprising at least one of the foregoing.

Embodiment 15

The poly(ester-carbonate) or the composition of any one or more of Embodiments 1 to 14, wherein a metalized sample of the poly(ester-carbonate) or the composition has a defect onset temperature that is within 20 degrees Celcius preferably within 10 degrees Celcius of the heat deflection temperature of the poly(ester-carbonate) or composition measured flat on a 80×10×4 mm bar with a 64 mm span at 0.45 MPa according to ISO 75/Bf.

Embodiment 16

The poly(ester-carbonate) or the composition of any one or more of Embodiments 1 to 14, wherein a metalized sample of the poly(ester-carbonate) or the composition has a defect onset temperature of 200 to 220° C.

Embodiment 17

The poly(ester-carbonate) or the composition of any one or more of Embodiments 1 to 16, wherein the composition at a given temperature has a melt viscosity of less than 900 Pa·s at 644.5 sec$^{-1}$ and has a shift in melt viscosity of less than 25% at the given temperature over 30 min under a nitrogen atmosphere as measured in a small amplitude oscillatory time sweep rheology at a fixed angular frequency of 10 radians/sec.

Embodiment 18

An article, wherein the article is a molded article, a thermoformed article, an extruded film, an extruded sheet, one or more layers of a multi-layer article, a substrate for a coated article, and a substrate for a metallized article made from the poly(ester-carbonate) or composition of any one or more of Embodiments 1 to 17.

Embodiment 19

A metallized article comprising the poly(ester-carbonate) or composition of any one or more of Embodiments 1 to 17 wherein the defect onset temperature of the metallized article is within 20 degrees Celcius preferably within 10 degrees Celcius of the heat deflection temperature of the poly(ester-carbonate) or the composition measured flat on a 80×10×4 mm bar with a 64 mm span at 0.45 MPa according to ISO 75/Bf.

Embodiment 20

A metallized article, comprising a substrate comprising the poly(ester-carbonate) or composition of any one of Embodiments 1-17; and a metal layer disposed on at least one side of the substrate.

Embodiment 21

The article of Embodiment 20, further comprising a protective layer disposed on the metal layer.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms; "cycloalkylene" refers to a divalent radical formed by the removal of two hydrogen atoms from two different carbon atoms on one or more rings of a cycloalkyl group; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible provided that the substitutions do not significantly adversely affect synthesis or use of the compound. Groups that can be present on a substituted position include nitro (—$NO_2$), cyano (—CN), hydroxy (—OH), halogen, thiol (—SH), thiocyano (—SCN), $C_{2-6}$ alkanoyl (e.g., acyl ($H_3CC(=O)$—)); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 1 to 3 separate or fused rings and from 6 to 18 ring carbon atoms.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A poly(carbonate-ester) copolymer comprising carbonate units of the formula

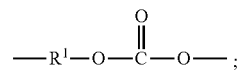

and ester units of the formula

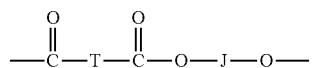

wherein:

T is a $C_{2-20}$ alkylene, a $C_{6-20}$ cycloalkylene, or a $C_{6-20}$ arylene; and $R^1$ and J are each independently a bisphenol A divalent group of the formula

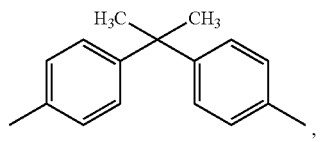

or a phthalimidine divalent group of the formula

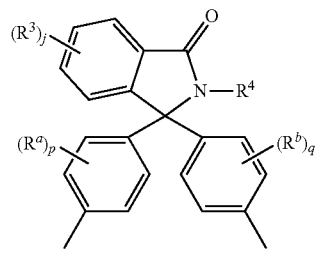

wherein $R^a$ and $R^b$ are each independently a $C_{1-12}$ alkyl, $C_{2-12}$ alkenyl, $C_{3-8}$ cycloalkyl, or $C_{1-12}$ alkoxy, each $R^3$ is independently a $C_{1-6}$ alkyl, $R^4$ is hydrogen, $C_{1-6}$ alkyl or phenyl optionally substituted with 1 to 5 $C_{1-6}$ alkyl groups, p, q, and j are each independently 0 to 4, or a third divalent group of the formula

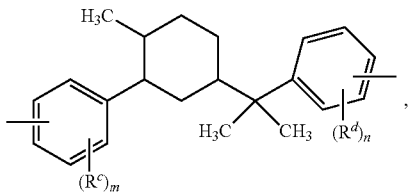,

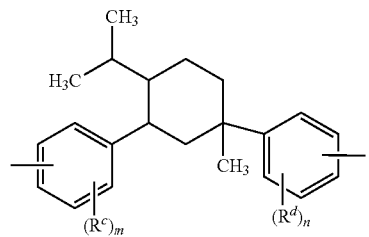,

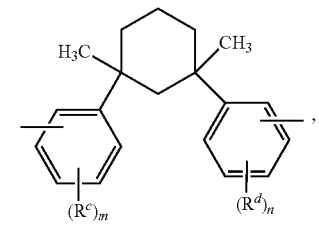,

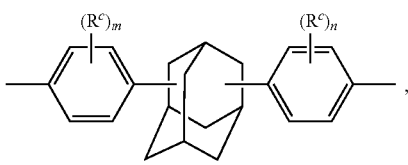,

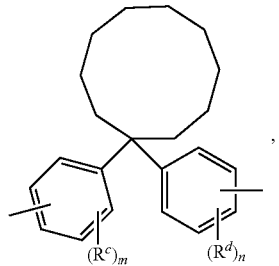,

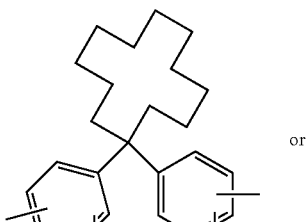 or

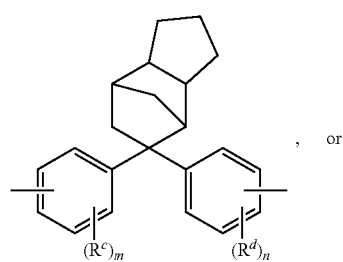, or

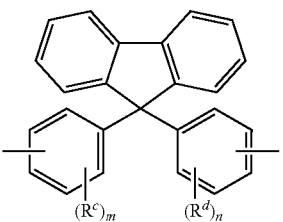

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, and m and n are each independently 0 to 4, provided that the at least one bisphenol A divalent group, at least one phthalimidine divalent group, and at least one third divalent group are present in the poly(carbonate-ester) copolymer.

2. The poly(carbonate-ester) copolymer of claim 1, wherein T is a $C_{6-20}$ divalent aromatic radical.

3. The poly(carbonate-ester) copolymer of claim 1, wherein T is a divalent isophthaloyl radical, a divalent terephthaloyl radical, or a combination thereof.

4. The poly(carbonate-ester) copolymer of claim 1, wherein the molar ratio of the carbonate units relative to the ester units is 2:1 to 1:2.

5. The poly(carbonate-ester) copolymer of claim 1, wherein p, q, and j are zero, and $R^4$ is hydrogen, methyl, or phenyl.

6. The A poly(carbonate-ester) copolymer comprising:

carbonate units of the formula

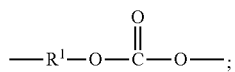;

and ester units of the formula

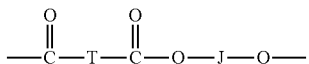

wherein:

T is a $C_{2-20}$ alkylene, a $C_{6-20}$ cycloalkylene, or a $C_{6-20}$ arylene; and $R^1$ and J are each independently a bisphenol A divalent group of the formula

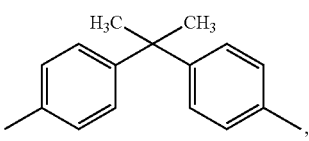, or a phthalimidine divalent group of the formula

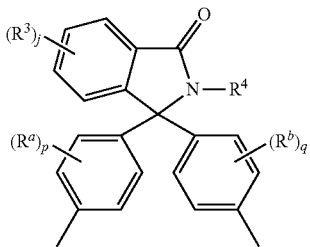

wherein
$R^a$ and $R^b$ are each independently a $C_{1-12}$ alkyl, $C_{2-12}$ alkenyl, $C_{3-8}$ cycloalkyl, or $C_{1-12}$ alkoxy,
each $R^3$ is independently a $C_{1-6}$ alkyl,
$R^4$ is hydrogen, $C_{1-6}$ alkyl or phenyl optionally substituted with 1 to 5 $C_{1-6}$ alkyl groups,
p, q, and j are each independently 0 to 4, or
a third divalent group has the structural formula

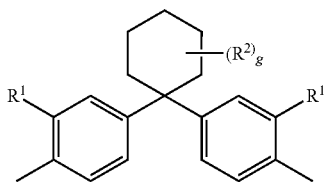

wherein
each $R^1$ is independently hydrogen or $C_{1-4}$ alkyl,
each $R^2$ is independently $C_{1-4}$ alkyl or hydrogen, and
g is 0 to 10,
provided that the at least one bisphenol A divalent group, at least one phthalimidine divalent group, and at least one third divalent group are present in the poly(carbonate-ester) copolymer.

7. The poly(carbonate-ester) copolymer of claim 6, wherein $R^1$ is methyl or hydrogen, $R^2$ is methyl or ethyl, and g is 0 to 3.

8. The poly(carbonate-ester) copolymer of claim 1, wherein the third divalent group is derived from 1,1-bis(4-hydroxyphenyl)-3,3,5-trimethyl-cyclohexane.

9. The poly(carbonate-ester) copolymer of claim 1, wherein the phthalimidine divalent group is present in an amount of 5 mol % to 30 mol % based on the sum of the moles of the bisphenol A divalent group, the phthalimidine divalent group, and the third divalent group.

10. The poly(carbonate-ester) copolymer of claim 1, wherein third divalent group is present in an amount of 2 mol % to 50 mol % based on the sum of the moles of the bisphenol A divalent group, the phthalimidine divalent group, and the third divalent group.

11. The poly(carbonate-ester) copolymer of claim 1, wherein the bisphenol A divalent group is present in an amount of 45 mol % to 70 mol % based on the sum of the moles of the bisphenol A divalent group, the phthalimidine divalent, and the third divalent group.

12. A thermoplastic composition comprising a poly(carbonate-ester) copolymer of claim 1.

13. The thermoplastic composition of claim 12 further comprising a polycarbonate homopolymer, an additional poly(ester-carbonate), or a combination comprising at least one of the foregoing.

14. The poly(ester-carbonate) or the composition of claim 1, wherein a metalized sample of the poly(ester-carbonate) or the composition has a defect onset temperature that is within 10 degrees Celsius of the heat deflection temperature of the poly(ester-carbonate) or composition measured flat on a 80×10×4 mm bar with a 64 mm span at 0.45 MPa according to ISO 75/Bf.

15. The poly(ester-carbonate) or the composition of claim 1, wherein a metalized sample of the poly(ester-carbonate) or the composition has a defect onset temperature of 200 to 220° C.

16. The poly(ester-carbonate) or the composition of claim 1, wherein the composition at a given temperature has a melt viscosity of less than 900 Pa·s at 644.5 $sec^{-1}$ and has a shift in melt viscosity of less than 25% at the given temperature over 30 min under a nitrogen atmosphere as measured in a small amplitude oscillatory time sweep rheology at a fixed angular frequency of 10 radians/sec.

17. An article, wherein the article is a molded article, a thermoformed article, an extruded film, an extruded sheet, one or more layers of a multi-layer article, a substrate for a coated article, and a substrate for a metallized article made from the poly(ester-carbonate) or composition of claim 1.

18. A metallized article comprising the poly(ester-carbonate) or composition of claim 1 wherein the defect onset temperature of the metallized article is within 10 degrees Celsius of the heat deflection temperature of the poly(ester-carbonate) or the composition measured in accordance with measured flat on a 80×10×4 mm bar with a 64 mm span at 0.45 MPa according to ISO 75/Bf.

19. A metallized article, comprising
a substrate comprising the poly(ester-carbonate) or composition of claim 1; and
a metal layer disposed on at least one side of the substrate.

* * * * *